United States Patent [19]

Gauthier

[11] 4,392,071
[45] Jul. 5, 1983

[54] GENERATOR FOR UNDERWATER LIGHTING SYSTEMS

[76] Inventor: Richard Gauthier, 38 Glen Rd., Morin Heights, Quebec, Canada

[21] Appl. No.: 282,390

[22] Filed: Jul. 13, 1981

[51] Int. Cl.³ .......................................... H02K 47/04
[52] U.S. Cl. ...................................... 310/113; 310/87; 310/171
[58] Field of Search ................... 310/66, 87, 102, 104, 310/113, 156, 171, 112; 363/102; 322/13

[56] References Cited

U.S. PATENT DOCUMENTS

| | | | |
|---|---|---|---|
| 1,978,688 | 10/1934 | Petersen | 310/113 |
| 2,099,972 | 11/1937 | Dalen et al. | 310/66 |
| 2,354,563 | 7/1944 | Weisse | 310/104 X |
| 2,481,196 | 9/1949 | Bulliet | 310/156 X |
| 3,869,626 | 3/1975 | Puttock et al. | 310/156 X |

FOREIGN PATENT DOCUMENTS

| | | | |
|---|---|---|---|
| 52-6911 | 1/1977 | Japan | 310/113 |
| 52-43912 | 4/1977 | Japan | 310/66 |

*Primary Examiner*—John Gonzales
*Attorney, Agent, or Firm*—David S. Fishman

[57] ABSTRACT

The invention relates to a low current, low voltage generator for use in an underwater lighting system. The generator is driven by a commercially available source of power, for example, house current. The generator consists of an AC motor having an output shaft and a magnet mounted on the shaft for rotation therewith. A coil arrangement is disposed in a plane parallel with but spaced from the plane of the magnet. The magnet is cylindrical in shape and includes a slot in the front face which faces the coil arrangement. Thus, when the magnet is rotated, it produces an EMF in the coil arrangement to provide a low current low voltage AC output at the output of the coil arrangement, which can be rectified to provide a DC output if required.

7 Claims, 1 Drawing Figure

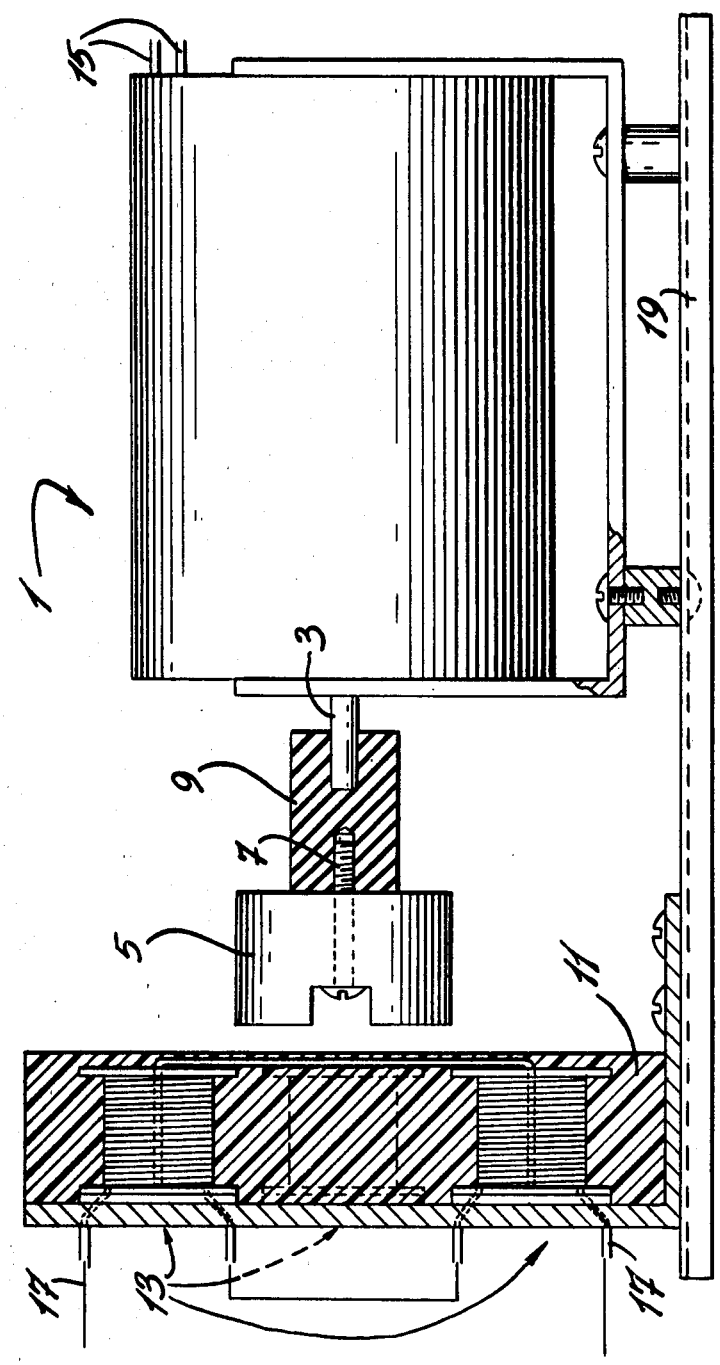

GENERATOR FOR UNDERWATER LIGHTING SYSTEMS

BACKGROUND OF INVENTION (a) Field of the Invention

This invention relates to an underwater lighting system. More specifically, the invention relates to such an underwater lighting system which includes a fully isolated low current, low voltage generator.

(b) Description of Prior Art

Underwater lighting systems for swimming pools are useful both from an aesthetic point of view and to provide lighting for night swimming. However, the present available lighting systems have problems. Thus, if the light used is an AC powered light, then AC wires must be strung into the water. This is dangerous as if the wire should break or if the insulation should wear-off, then the electricity will be carried through the water and electrocute any swimmers.

While using DC power instead of AC power it eliminates this danger, DC batteries are expensive and run down too soon for prolonged use as power sources for underwater lighting systems.

A suitable solution then would be to provide a low current, low voltage generator which could be driven from commercially available power sources, e.g. house current. However, the converter must include complete electrical isolation, that is, the output must be completely isolated from the source power, so that the high voltage source power, even in the event of failure, will not be directed to the swimming pool water.

There are presently available AC or DC generators as exemplified in, for example, U.S. Pat. Nos. 515,885, Mar. 6, 1894; 1,034,890, Aug. 6, 1912; 1,375,319, Apr. 19, 1921; 1,405,965, Feb. 7, 1922; 1,508,096, Sept. 9, 1924; 1,583,809, May 11, 1926; 2,361,237, Oct. 24, 1944; 2,433,390, Dec. 30, 1947; 2,671,180, Mar. 2, 1954; 2,832,907, Apr. 29, 1958; 2,867,738, Jan. 6, 1959; 2,882,474, Apr. 14, 1959; 3,237,084, Feb. 22, 1966. However, these converters are not sufficiently safe for use in underwater lighting systems.

SUMMARY OF INVENTION

It is therefore an object of the invention to provide an underwater lighting system which eliminates danger of electrocution of swimmers in the pool.

It is a more specific object of the invention to provide an underwater lighting system which includes a fully isolated low current, low voltage generator.

In accordance with the invention there is provided, for an underwater lighting system, a low current, low voltage generator comprising an AC motor having an output shaft; means mounting a magnet for rotation with said shaft; a coil arrangement disposed in a plane parallel with but spaced from the plane of said magnet; whereby, rotation of said magnet produces an EMF in said coil arrangement to provide a low current, low voltage output at the output of the coil arrangement.

BRIEF DESCRIPTION OF DRAWINGS

The invention will be better understood by an examination of the following description together with the accompanying drawing in which:

FIG. 1 illustrates an AC generator in accordance with the invention.

DESCRIPTION OF PREFERRED EMBODIMENTS

Referring now to the drawings, the AC generator for the underwater lighting system includes an AC motor 1. Such motors are well known in the art and in a preferred embodiment the motor is one which is powered by a 115 volts AC source and which rotates at 10K rpm.

Output shaft 3 of the AC motor has means thereon for mounting permanent magnet 5 for rotation therewith. The means for mounting the magnet includes a shaft 7 extending from the magnet and an isolation coupling 9 having openings for receiving both the shaft 3 and the shaft 7. As can be clearly seen, the magnet 5 will rotate about the axis 3 as a center. The magnet itself is cylindrical in shape and has a slot 6 extending diametrically across the face of the magnet facing the coil arrangement.

Disposed in a plane parallel to the magnet but spaced therefrom is a coil arrangement 11 including a plurality of coils 13. In a preferred embodiment, the coil arrangement includes four coils spaced at 90° from each other. The center of the coil arrangement corresponds with the center of rotation of the magnet 5.

The motor 1 is fed through input 15, and a low current, low voltage AC output is provided at the leads 17 of the coil arrangement 11. This can, as is well known, be rectified to provide a DC output.

A fixture with a socket (not shown) for receiving a light bulb would have its input leads connected to the leads 17, and the lights would, of course, be operated by an output of the coils.

In operation, when the magnet is rotated, pulses of EMF will be set up in each coil each time the slot passes the coil. It will therefore be recognized that a different shape magnet could be used as long as there is a discontinuity in the magnetic field produced by the magnet. The coil assembly and magnet is selected to produce a low current, low voltage AC signal at the output of the coil assembly. The AC output is of the order of 6–12 VAC, which could be rectified to provide a DC output of the same order.

The coil assembly is preferably potted in an insulating material. Thus, there is a physical spacing between the input AC side of the generator and the output side. In addition, there is an insulator protecting the output leads of the coils from the input AC side of the generator. In any case, the AC is not being directly transformed to a lower voltage power. Instead, the AC is driving a motor which rotates a magnet of a low voltage, low current generator.

Accordingly, it can be seen that there is no possibility of input AC power coming on to the output leads and entering the water of the swimming pool.

Although a single embodiment has been above described, this was for the purpose of illustrating, but not limiting, the invention. Various modifications which will come readily to the mind of one skilled in the art are within the scope of the invention as defined in the appended claims.

I claim:

1. For an underwater lighting system, a low current, low voltage generator, comprising:
   an AC motor having an output shaft extending along a first axis;
   means mounting a magnet for rotation with said shaft about said first axis;

said magnet being electrically isolated from said AC motor;

a coil arrangement, comprising an even number of coils, disposed in a plane perpendicular to said first axis, and spaced from said magnet, said coil arrangement having a longitudinal axis which is parallel with said first axis;

said coil arrangement being electrically isolated from said magnet;

whereby, rotation of said magnet produces an EMF in said coil arrangement to provide a low current, low voltage AC output at the output of the coil arrangement.

2. A generator as defined in claim 1 wherein said output shaft has a center, said magnet has a center, and said coil arrangement has a center, all of said centers being in alignment.

3. A generator as defined in claim 2 wherein said coil arrangement comprises four coils, each of said coils being equally spaced from the center of said coil arrangement, adjacent one of said coils being spaced at 90° from each other.

4. A generator as defined in claim 3 wherein said coil arrangement is potted in an insulating material.

5. A generator as defined in claim 4 wherein said AC motor comprises an input for receiving power from a source of AC;

and wherein said coil arrangement has output terminals to provide low current, low voltage power.

6. A generator as defined in claim 5 wherein said means mounting said magnet comprises an insulation coupling disposed between said AC motor and said magnet.

7. A generator as defined in claim 6 wherein said magnet is cylindrical in shape having a front face facing said coil arrangement and a rear face; and a slot extending diametrically across said front face.

* * * * *